United States Patent [19]

Stovall

[11] 4,281,572

[45] Aug. 4, 1981

[54] SAW GUIDE FOR ANGLE CUTS

[76] Inventor: Marvin S. Stovall, 2211 Hawkins La., Eugene, Oreg. 97405

[21] Appl. No.: 76,934

[22] Filed: Nov. 19, 1979

[51] Int. Cl.³ .............................................. B27B 5/00
[52] U.S. Cl. ...................................... 83/745; 83/522; 33/443
[58] Field of Search ........................ 83/743, 745, 522; 33/430, 443, 467, 470

[56] References Cited

U.S. PATENT DOCUMENTS

| 3,827,468 | 8/1974 | Markham | 33/443 X |
|---|---|---|---|
| 4,125,942 | 11/1978 | Horner | 83/745 X |

*Primary Examiner*—J. M. Meister

*Attorney, Agent, or Firm*—Kolisch, Hartwell & Dickinson

[57] ABSTRACT

A guide for use with a powered hand saw for making controlled cuts in a workpiece at an infinite number of angles. The guide includes a pair of parallel spaced rails, a pair of carriages slidably mounted on the rails, and for each carriage, a clamping assembly for clamping the guide onto a workpiece. Each clamping assembly includes an arm having an inner end swingably mounted on the associated carriage. Each carriage also includes disengageable stop-lock mechanism for locking the associated clamping-assembly arm in a preselected angular position relative to the carriage. Provided on each arm is a pointer for pointing at angular position markings on the associated carriage.

3 Claims, 6 Drawing Figures

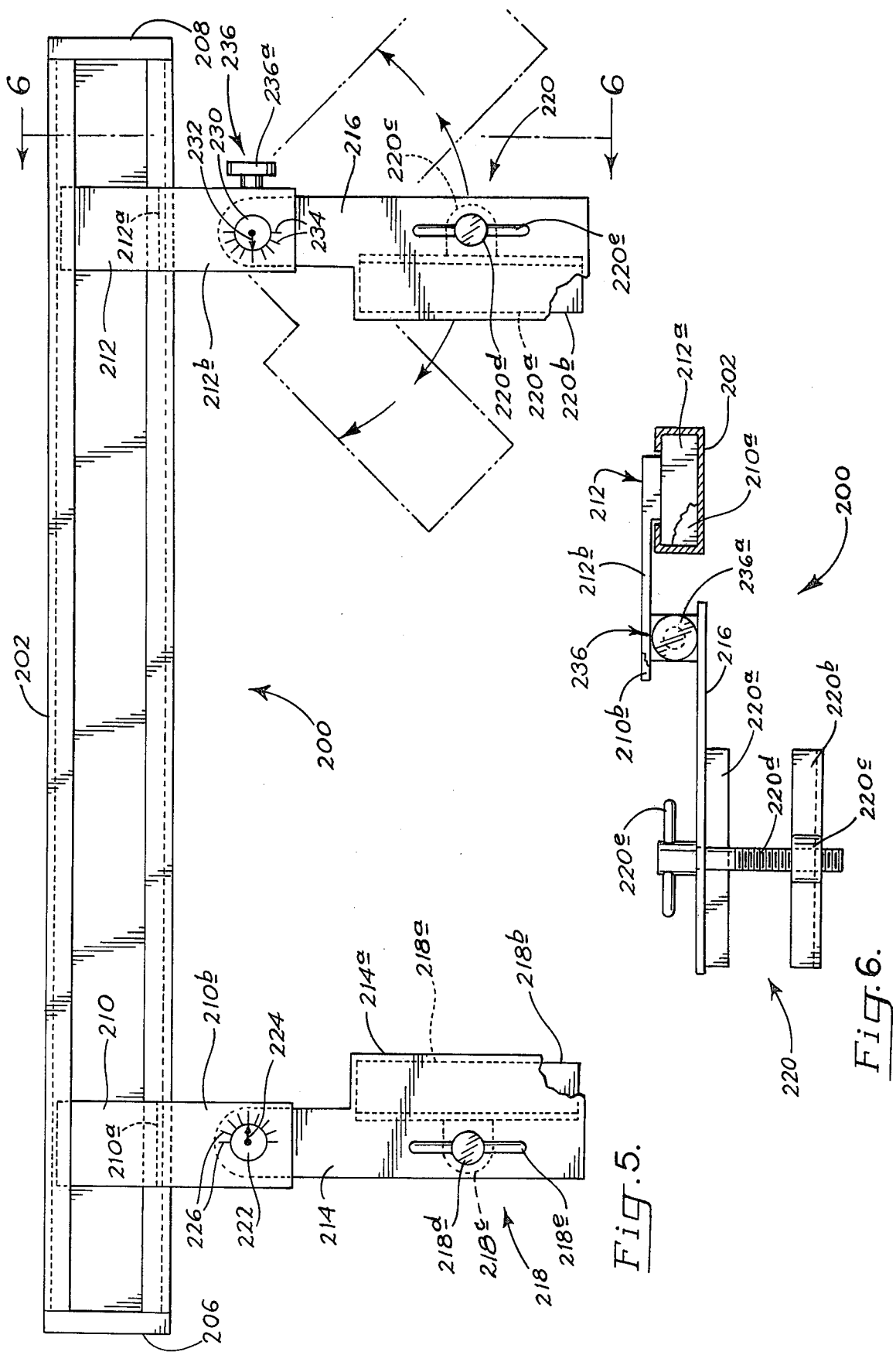

SAW GUIDE FOR ANGLE CUTS

BACKGROUND AND SUMMARY OF INVENTION

This invention relates to an adjustable guide for guiding a powered hand saw in making cuts in a workpiece.

It is very difficult, if not impossible, to make a straight-line cut in a piece of lumber or the like with a powered hand saw without a guide. In a lumber-cutting operation, sheets of lumber must be cut into pieces having various shapes and sizes. A guide having a great many adjustment capabilities is needed to accommodate the above-described variety of cuts.

A general object of the present invention is to provide a guide which can be used to guide a powered hand saw in cutting an infinite variety of angles in various sizes of lumber and the like.

More particularly, an object of this invention is to provide a guide which can be adjusted to fit many different sizes of lumber.

Another object of the invention is to provide such a guide which can be attached easily and securely to a piece of lumber at an infinite number of angles.

A further object of the invention is to provide a guide of the type so far indicated which can be locked in many different preselected angular positions.

Yet another object of the invention is to provide such a guide which has angular position markings and, for each set of markings, an assoicated pointer for pointing at the markings to register the angular position of the guide.

In one embodiment of the invention, a pair of parallel spaced rails support a pair of carriages slidably mounted thereon. Swingably mounted on each carriage is one end of an arm, with the other end thereof carrying a clamp. Each carriage includes a stop-lock mechanism for locking the associated arm in a preselected angular position relative to the carriage.

In another embodiment, a channel member forms a rail for receiving two carriages. Clamp-carrying arms are swingably mounted on these carriages, with one such arm, but not the other, being detentably lockable in different preselected angular positions.

In use, the carriages are slidably adjusted to fit the size of the workpiece. The arms are swung toward the workpiece and the clamps are clamped thereto. The guide is thereby locked in a selected angular relationship relative to a workpiece, and a cut is made.

These and other objects and advantages which are attained by the invention will become more fully apparent as the description which follows is read in conjunction with the accompanying drawings.

DESCRIPTION OF THE DRAWINGS

FIG. 5 is a top view of an alternative embodiment of a saw guide constructed according to the invention.

FIG. 6 is a cross-sectional view taken generally along the line 6—6 in FIG. 5.

DETAILED DESCRIPTION OF THE INVENTION

1. The embodiment of FIGS. 1-4, inclusive.

Figure 1:
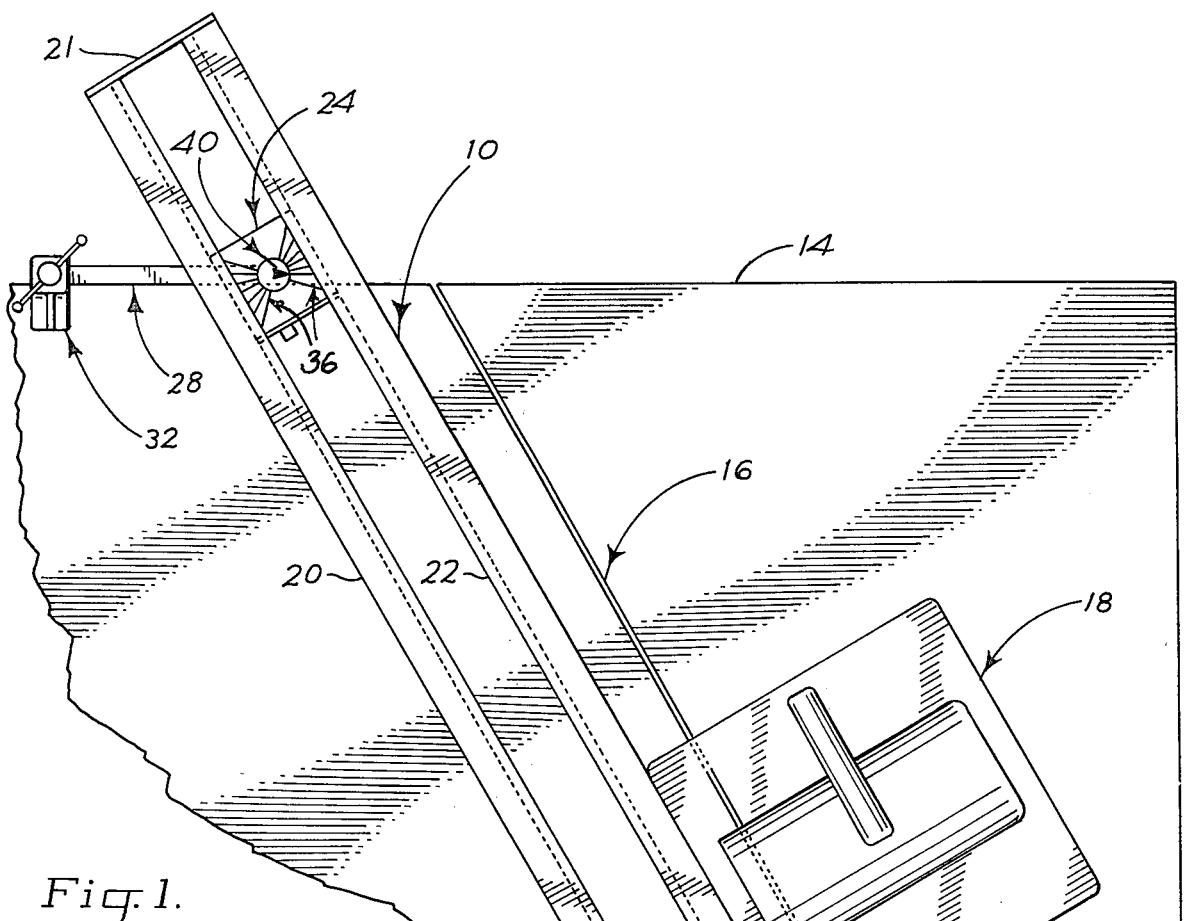
FIG. 1 is a fragmentary top in-use view of one embodiment of a saw guide constructed according to the invention.

Turning now to the drawings and referring first to FIG. 1, indicated generally at 10 is a saw guide which is removably fastened, as will be described, on a work piece (board) 14 for guiding a cut 16 made by a powered hand saw 18, as contemplated by the invention. In general terms, guide 10 includes a pair of parallel spaced rails, or rail members, 20, 22 which are suitably end-joined through end plates 21, 23. The rails slidably support a pair of carriages 24, 26 which swingably receive one set of ends of a pair of arms 28, 30, respectively—the opposite of ends in which carry clamps 32, 34, respectively. Provided in carriages 24, 26, and cooperating with the swingable mountings provided therein for arms 28, 30, are sets 36, 38 of angular positioned markings. Markings 36, 38 function, as will be described below, with pointers 40, 42, respectively, which rotate relative to the markings with swinging of arms 28, 30, respectively, to different angular positions relative to rails 20, 22.

Figure 4:
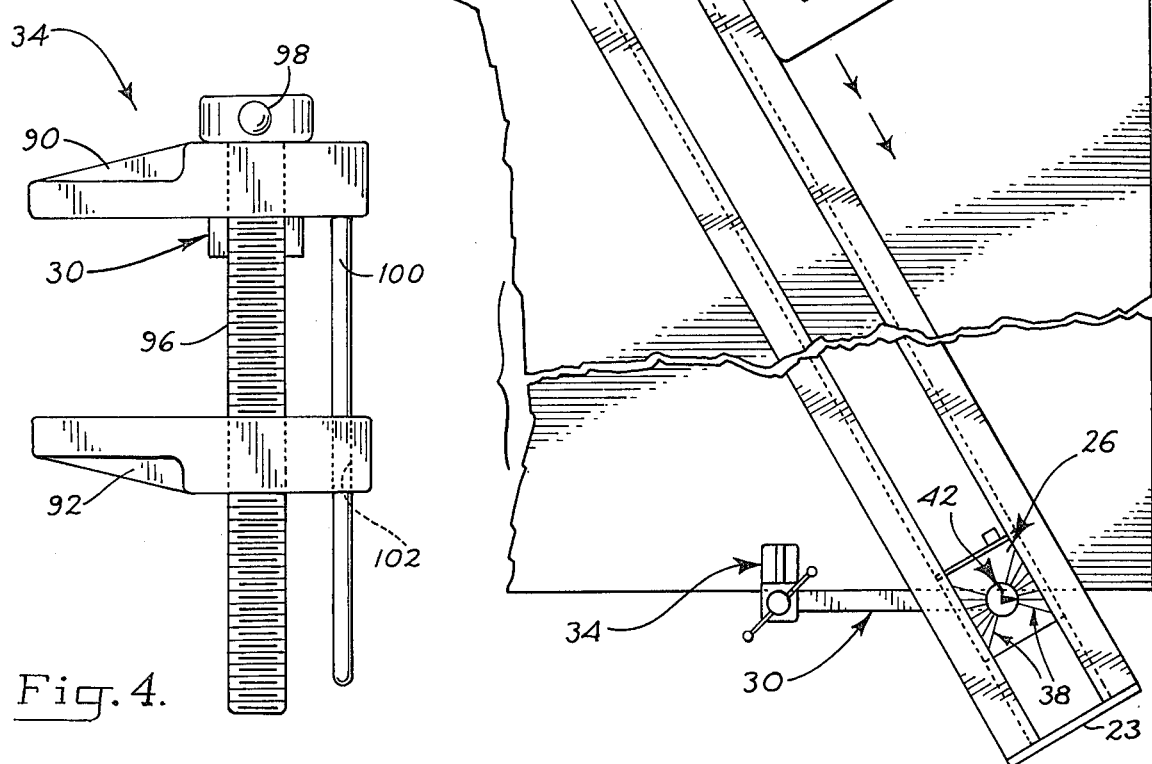
FIG. 4 is an elevation taken generally along line 4—4 in FIG. 2.
Figures 2, 3:
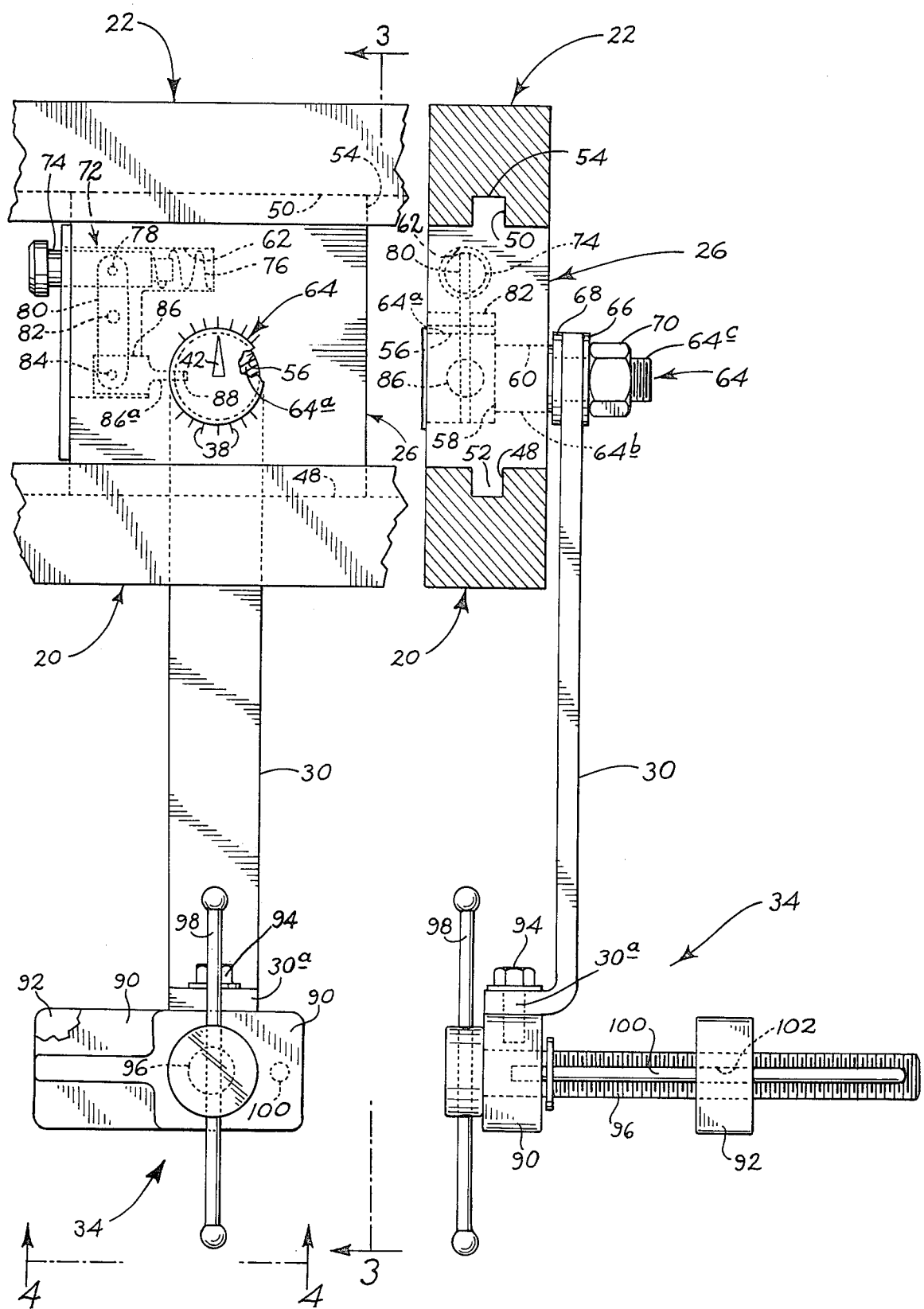
FIG. 2 is an enlarged, fragmentary top view illustrating a carriage and clamping assembly mounted on rails in the guide of FIG. 1, with the clamping assembly shown in a different angular position.
FIG. 3 is a view taken generally along line 3—3 in FIG. 2.

Considering in detail the construction of guide 10, we now turn attention particularly to FIGS. 2-4, inclusive. Rails 20, 22, called collectively rail means, are formed herein of substantially square cross-section bar stock, and include confronting, substantially parallel channels 48, 50, respectively, which extend along the lengths of the rails. Previously mentioned end plates 21, 23 (see FIG. 1) form a rigid structure with the rails, and maintain the latter in fixed, substantially parallel relationship.

Considering the construction of the two carriages, each being substantially the same as the other, carriage 26 is illustrated in detail in FIGS. 2 and 3. Carriage 26 includes opposed outwardly projecting tongues 52, 54 which extend along opposite sides of the carriage and fit slidably in channels 48, 50, respectively. Formed in and extending completely through the body in carriage 26 is a stepped-diameter bore including a large-diameter portion 56 joining through a shoulder 58 with a small-diameter portion 60 (see particularly FIG. 3). Also formed in the body of carriage 26, and illustrated particularly in FIG. 2, is a cavity 62 having the irregular shape generally illustrated in this figure.

Previously mentioned arm 30 has its upper end in FIGS. 2 and 3 key-mounted on the threaded end 64c of a stepped-diameter pin 64 which includes larger diameter portions 64a, 64b which are rotatably freely received within bore portions 56, 60, respectively. More specifically, arm 30 is received on pin end 64c with a pair of bearing washers 66, 68 seated against opposite sides of the arm, and is held in place by a nut 70 which is screwed onto the pin end. As can be seen, the end of pin 64 which is visible in FIG. 2 carries previously mentioned pointer 42. Previously mentioned position markings 38 are distributed as shown on that face of carriage 26 which is visible in FIG. 2 around portions of the periphery of bore portion 56. Markings 38 in FIG. 2 have been shortened in order to simplify the figure. Arm 30 turns as a unit with pin 64.

According to an important feature of the invention, a disengageable stop-lock mechanism is provided for locking arm 30 releasably in different preselected and often used angular positions with respect to carriage 26. This mechanism is indicated generally at 72 in FIG. 2, with a major portion of this apparatus residing and mounted within cavity 62. Considering the construction of mechanism 72, it includes a finger-actuated plunger 74 which is biased to the left in FIG. 2 by a compression spring 76. Pivotally connected at 78, within a suitable slot formed in the body of plunger 74, is a lever arm 80—this arm being centrally pivoted through a pin 82 to the body of carriage 26. The lower end of arm 80 is pivoted at 84 within a central slot formed in the body of detent finger 86—this detent finger including a prong 86a which is adapted for releasable seating in a plurality of radially outwardly facing sockets formed in pin portion 64a. One of these sockets is shown in FIG. 2 at 88.

In FIG. 2, mechanism 72 is shown in a condition locking arm 30 in the angular position shown for it in the figure, relative to the rails and to carriage 26. Depression of plunger 74, in a direction to the right in FIG. 2, causes disengagement of prong 86a and pin portion 64a, and permits swinging of the arm, to a different angular position. Release of the plunger causes relocking, of the arm in a new preselected position.

Previously mentioned clamp 34 is mounted as will be described on the outer end 30a in arm 30. This clamp includes a pair of opposed, relatively movable clamp members 90, 92—member 90 being fastened through a bolt 94 to arm end 30a. Clamp member 90 is fixed with respect to arm 30, and clamp member 92 is, as will be seen shortly, movable with respect to the arm. Further included in clamp 32 is the usual clamp-actuating screw 96 which is rotatably received in clamp member 90, and which is turned by means of a handle 98 located on the left side of clamp member 90 in FIG. 3. A guide pin 100 anchored to clamp member 90 extends along one side of screw 96, with the pin's axis substantially parallel to the axis of the screw. A bore 102 provided in clamp member 92 freely receives this pin, and cooperates with the pin to prevent rotation of member 92 with turning of the screw. Obviously, as screw 96 turns, member 96 moves along pin 100 relative to member 90.

As was mentioned earlier, carriage 24 is substantially a duplicate of carriage 26. The same is true also with respect to arm 28 and its mounting on carriage 24, vis-a-vis arm 30 and its mounting on carriage 26. Finally, clamp 32 is substantially the same in construction as clamp 34.

When it is desired to use the guide of the invention to cross-cut a board at any selected angle, the stop-lock mechanisms are released, the guide is placed on the board at the desired angle, and the carriages are appropriately adjusted along the rails, and the clamps are swung to positions capable of gripping the opposite sides of the board. If the "desired angle" corresponds to what was called herein earlier a preselected angle, the stop-lock mechanisms are re-locked.

With the clamps then tightened to the board, the guide is then firmly secured to the board a the condition to guide a saw cut. Naturally, the selected edge in one of the guide rails which is to act as the particular guide line for a cut is placed at a known distance from a line along which the actual cut is intended to be made. This distance, of course, depends upon the dimensions of the particular saw being used.

When a cut is complete, the guide is easily and quickly removed from the board, and is ready for reuse.

2. The embodiment of FIGS. 5 and 6.

Illustrated in FIGS. 5 and 6 in the drawings is an alternative embodiment of the saw guide of the invention. This embodiment is indicated at 200, and in general terms includes an elongated extruded member 202, having the cross-sectional configuration clearly indicated in FIG. 6, which forms a rail member, end caps 206, 208 joined to opposite ends of member 202, a pair of carriages 210, 212, a pair of arms 214, 216 pivotally mounted on carriages 210, 212, respectively, and a pair of clamps 218, 220 carried on the outer ends of arms 214, 216, respectively.

Considering the construction of the carriages, and first with reference to carriage 210, the same includes a slider portion 210a which is received slidably within the channel of rail member 202, and a projection portion 210b which is joined to the top of portion 210a and which projects laterally from member 202. Similarly, carriage 212 includes portions 212a, 212b which correspond to carriage portions 210a, 210b respectively.

The upper end of arm 214 in FIG. 5 is hinged through a pin 222 to the lower end of projection 210b in the figure. The upper end of pin 222 is provided with an arrow 224, which points toward radially distributed angular position markings, such as markings 226, that are formed on the top surface of projection portion 210b. With swinging of arm 214 relative to carriage 210, pin 222 turns with the arm, with arrow 224 thus turning relative to markings 226.

The lower end of arm 214 is provided with a lateral offset 214a, below which are disposed upper and lower angle members 218a, 218b, respectively, which function as clamping plates. Member 218a is rigidly joined to the underside of offset 214a. Member 218b has joined to it a laterally extending lug 218c having a threaded bore which receives the lower end of a clamping adjustment screw 218d. The upper end of screw 218d is unthreaded, and extends through a suitable accomodating bore in the lower end of arm in FIG. 5. Further, joined to the upper end of screw 218d is an adjustment handle 218e.

In guide 200, the hinge connection provided between carriage 210 and arm 214 is undetented.

Clamp 220, as can be seen, is substantially a mirror-image duplicate of clamp 218. Thus, it includes upper and lower clamping angle members 220a, 220b, respectively, a lug 220c on member 220b, an adjustment screw 220d, and an adjustment handle 220e.

Arm 216 which carries clamp 220 is hinged to projection portion 212b in carriage 212 through a hinge pin 230, the upper end of which carries an arrow 232 which works in conjuncton with angular position markings, such as markings 234, to indicate the angular position of arm 216 relative to carriage 212. One difference which exists in the mounting provided between carriage 212 and arm 216, as compared with the mounting provided between carriage 210 and arm 214, is that the former mounting is provided with a detenting mechanism indicated generally at 236. Mechansim 236 includes an inwardly spring-biased detenting pin 236a which has an inwardly projecting finger (concealed). This finger is removably receivable in a plurality of accommodating bores which are distributed radially about hinge pin 230. Thus, in guide 200 whereas arm 214 is a free-swinging arm, arm 216 is detentably lockable in different preselected angular positions.

From the description which has just been given, it is believed obvious how guide 200 may be used to guide saw cuts.

Thus, while two embodiments of the invention have been described herein, it is appreciated that variations and modifications may be made without departing from the spirit of the invention.

It is claimed and desired to secure by Letters Patent:

1. A guide for use with a powered hand saw for making controlled cuts at an infinite number of angles in a workpiece, said guide comprising elongate rail means defining a cutting path for such a saw, a pair of carriages mounted on said rail means for independent movement therealong to an infinite number of different spaced positions relative to one another, with each carriage inluding angular position markings related to preselected angular positions, and means for each carriage for clamping the same onto a workpiece at an infinite number of angles relative thereto, each of said clamping means including an elongated arm mounted adjacent one of its ends on the associated carriage for swinging in a plane common with the arm in the other clamping means to accommodate adjustment of the rail means to different angles relative to a workpiece, and a clamp assembly attached to the other end of arm for clamping onto a workpiece, and further including pointer means movable as a unit with the arm for pointing toward the associated position markings.

2. The guide of claim 1, wherein said rail means comprises a pair of elongated rail members cooperating with each other in a defined, substantially parallel relationship, said rail members being constructed to receive said pair of carriages for slidable fitment therebetween.

3. The guide of claim 1, wherein at least one carriage includes a disengageable stop-lock mechanism for selectively locking the associated clamping means in different angular positions relative to the carriage.

* * * * *